Patented Sept. 11, 1923.

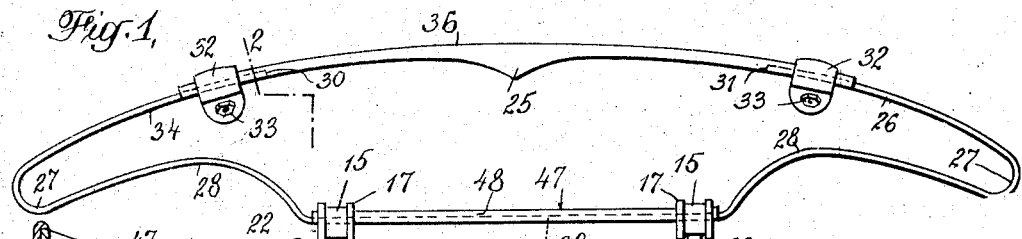

1,467,390

UNITED STATES PATENT OFFICE.

GEORGE ALBERT LYON, OF PHILADELPHIA, PENNSYLVANIA.

AUTOMOBILE BUFFER AND ATTACHMENT THEREFOR.

Application filed November 23, 1922. Serial No. 602,679.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Automobile Buffers and Attachments Therefor.

This application is a partial continuation of my application Serial No. 358,239, filed February 12, 1920, and renewed February 4, 1921, as Serial No. 534,275, and Serial No. 592,940, filed October 7, 1922; that is, this case contains subject matter taken therefrom.

This invention relates especially to automobile buffers with which may be combined brace bars or transverse supporting members or buffer portions which may be secured or connected to the two frame members of the automobile or other vehicle to reenforce and strengthen them and also support the buffer therefrom. For this purpose special frame ends which may be riveted or otherwise connected to the forward ends or portions of the usual channel section frame members of the vehicle may advantageously be provided with heads or supporting portions which may have a substantially vertical contact face, if desired, and also one or more cooperating aligning portions to be engaged by ribs or flanges on the cooperating buffer member or brace bar portion. This transverse buffer supporting member or brace bar portion may advantageously be of spring channel construction and may be bolted or otherwise secured to each of the supporting heads or frame ends as by having one or more bolts pass through the brace bar member so as to engage the frame end in a horizontal or vertical direction and thus tightly bolt or clamp the buffer member thereto. This makes a strong and neat method of attaching the buffer to the automobile and simultaneously gives a strong and reliable reenforcing connection between the front ends of the frame members which is quite desirable in many cases. This form of attachment is particularly desirable for buffers which are installed as part of the regular automobile equipment and attached to the automobiles before they are sent out from the factory where these special supporting frame ends may be installed. This transverse supporting or brace bar portion of the buffer may, if desired, have its ends bent upward in some cases beyond the frame end connections so that these end connecting portions may be arranged, if desired, several inches above the frame ends so as to correspondingly raise the connected buffer elements which may be of any suitable construction; although if the brace bar connector ends are horizontally in line with the frame ends to which they are secured, the buffer is somewhat more strongly supported under collision conditions. A Lyon type buffer front is desirable in this connection and may comprise several reenforcing or overlapping spring strips or members permanently or adjustably connected together and preferably having end loops and inturned connector portions which may be clamped or connected to the end connector portions of the brace bar member, if desired. In some cases, however, a spring channel front member or vertically wide front plate of flanged or channeled construction may be used in the buffer front and may be connected to separate spring strip end loop portions supported in any desired way from the frame ends so as preferably to connect them together and have a laterally bracing action thereon.

In the accompanying drawing showing in a somewhat diagrammatic way various illustrative embodiments of this invention:

Fig. 1 is a plan view partly in section showing an illustrative buffer construction.

Fig. 2 is a transverse section thereof taken substantially along the line 2—2 of Fig. 1.

Figs. 3, 4 and 4ª are plan views showing other illustrative constructions.

Fig. 5 is a front view of the brace bar portion shown in Fig. 4.

Fig. 6 is an enlarged transverse section thereof taken along the line 6—6 of Fig. 5, and Figs. 7 and 9 are similar transverse sections showing modified constructions, and Fig. 8 is a plan view of another illustrative buffer.

Fig. 1 shows an illustrative buffer which may have a front plate of single or double vertical width, as desired, and suitably connected to the inturned connecting ends or front connector portions 26, 34 of spring strip material. In this instance one or two such spring strips are used each comprising an end loop 27 and an inwardly curving resilient portion 28 which may have inturned rear connector portions or, if desired, may have a single rear connecting or supporting portion 29 extending across the rear of the buffer preferably in connection with a spring steel or other resilient rear channel member 47 which, as indicated in Fig. 2, may have these inturned rear connecting portions embraced and aligned between its rearwardly extending flanges 48. As indicated in Fig. 2, it is sometimes advantageous to have these two end loop elements of the buffer upwardly inclined so that their front connector portions are two to four inches above the rear supporting portion or member of the buffer. This serves to raise the buffer front somewhat above the frame ends where, for instance, the supporting member is directly connected thereto. All these parts may of course be enclosed and held together by any desired form of clamping or connecting devices such for instance as the enclosing clamps indicated in Fig. 1 in connection with the special recessed frame ends 15.

The supporting or brace bar portions of the buffer may as indicated in Fig. 2 be clamped or connected to supporting bosses 15 which may extend on one or both sides of the special frame ends rigidly connected to the usual channeled frame members or goose necks 22. Any convenient means for connecting these parts may be used and as indicated the supporting boss may be formed with an integral supporting or securing portion 16 extending within the channeled frame member and welded, riveted or otherwise connected thereto in a rigid way. This supporting boss may of course accommodate the end of the usual spring 23 which may be secured by a spring hanger bolt 14 passing through the boss if desired. This supporting boss may be formed with a recess of such size as to accommodate the one or more spring strips constituting this supporting brace bar portion of the buffer and a straight or rectangular sectioned recess of this character may support the flat sectioned strips as indicated in Fig. 2 in connection with one or more supporting clamps such as 17 which may be arranged around these parts and strongly clamped upon the same as by a tightening bolt 19 passing through the ends 24 of this clamp. It is usually advantageous to form the one or more bosses provided on each frame member with a retainer lug or portion such as 21 projecting outward to at least a slight extent beyond the cooperating face of the boss which may be substantially flat or vertical, if desired. The supporting clamp of wrought or malleable material may be sufficiently expanded to be slipped over this retainer portion and then tightened inside the same which definitely holds the parts in this securing position and positively prevents the clamps slipping sidewise from the supporting boss. As indicated in Fig. 1 two such supporting clamps 17 may be used on each supporting boss or frame end 15 and in this way an amply strong and rigid connection may be secured between the supporting or brace bar portion of the buffer and the frame ends so as to considerably strengthen and reenforce them against lateral yielding and breakage.

Fig. 3 shows another form of construction in which the supporting or brace bar portion 65 may be a single strip of spring steel or other resilient material having the outwardly extending connector portions 62 and the curved portions 63, 64 which give greater resilient yield to the parts. The buffer front may in this instance comprise one or more strips having end loops 58, 59 and inturned connector portions or ends 60, 61 to be clamped or connected to the cooperating connector portion 62 as by the enclosing clips 70, 71. When as illustrated the impact receiving or front portion of the buffer comprises two overlapping strips 56, 57 a considerable degree of lateral adjustment is thus secured and these front strips may be clamped in any desired adjusted position by the enclosing clamps 68, 69. The supporting portion 65 of this type of buffer may be similarly clamped or connected to the automobile frame members in the manner previously described, or if desired, other supporting devices may be used on this or other illustrated types of construction, and for this purpose separate spring strip or other attaching members, which may be clamped or connected to the automobile frame members, may be formed with the usual bent connector portions so that they can be connected as by the clamping devices or clips to this supporting or transverse portion 65 of the buffer. It is thus unnecessary in all cases to directly connect this or the other types of buffer to special supporting bosses such as illustrated in Fig. 2.

In the illustrative arrangement shown in Figs. 4 and 5 the rear transverse supporting member or brace bar portion 6 may be formed of a channeled spring steel section of such size as to substantially fit the vertical face 3 of the supporting frame end or head 1 shown in Fig. 6. The stiffening flanges 7 on this member are preferably arranged to extend rearwardly so that at least one of these flanges engages one of the aligning edges or faces 2 of the heads to which the member may be clamped or bolted in any suitable way. For this purpose the head may be provided with one or more threaded apertures 4 to accommodate the threaded ends of bolts such as 5 which may pass through suitable holes or slots in the transverse spring channel or other supporting member so that they hold this member securely in position against the contact faces of the two cooperating heads. These heads or supporting frame ends may advantageously be formed with integral rearwardly extending supporting portions 16 which may pass within the ends of the channeled frame members 22 and be welded, bolted or riveted thereto so as to securely support the forwardly projecting head 1 therefrom. This built-in head or supporting frame end is also preferably formed with a spring hanger connection so that the spring hanger bolt 14, may for example, pass transversely through the head and secure the front end of the spring 23 thereto.

As shown in Fig. 5, the ends of this rear supporting member or portion 6 may be vertically displaced or raised at 8 so as to form the raised and preferably substantially horizontal connector portions 9 on the outside of the frame members two to four inches above the central portion of this transverse member and adapted to be clamped or connected to the cooperating buffer elements. A Lyon type buffer front may be used for this purpose and may comprise the tempered spring steel strips having their front or impact receiving portions 12 adjustably or otherwise connected in overlapping or reenforcing position as by the enclosing clips 73. These strips may have integral end loops 11 and inturned connector portions 10 which preferably fit fairly snugly within the rearwardly extending flanges 7 of the supporting member so that they may be clamped or connected thereto as by the enclosing clamping devices 74. As illustrated in Fig. 4ª, however, the end connector portions of this spring channel rear supporting member need only extend out a short distance on each side of the supporting bosses or frame ends to which they are bolted or clamped. These outwardly projecting end connector portions 88 may be substantially straight and the cooperating inturned connector portions 89 of the buffer front strips or end loop members may be clamped or connected thereto in any suitable way such as by the round headed bolts 90 which may have these ornamental bolt heads on the front sides of the cooperating buffer members while the nuts may, if desired, be located behind where they are more or less concealed from view from the front of the buffer.

Fig. 7 shows another form of supporting boss or frame end which may be similarly connected to the forward ends of each of the frame members 22. This frame end may comprise the projecting head 1 adapted to accommodate the spring hanger bolt 14 and having a substantially vertical contact face 3 and one or more aligning edges or faces 2 at substantially right angles thereto. The cooperating buffer member such as the transverse supporting portion or member 76 may be formed with one or more rearwardly extending flanges 77 adapted to cooperate with these aligning edges of the head and be clamped or bolted thereto as by the clamping bolt 79 which may pass through the plain or threaded hole 78 in the head and through suitable slots or holes in any projecting flanges of the transverse buffer member so as to securely hold these parts in the desired position when the nut 80 is tightened; even when the buffer member only has a flange 77 on its upper edge this tightening action is effective and the threads of the bolt may engage the threaded aperture 78 making unnecessary the nut 80 in this instance.

The buffer shown in Fig. 8 may have the same general buffer front construction; the inturned connector ends 83 are, however, preferably brought further inward and may be provided with substantially straight connector portions ending at about the points 84. These may cooperate with a substantially straight rear transverse supporting member into which these connector portions are adapted to fit tightly enough to be aligned, the rearwardly extending flanges 87 of this rear member being suitably spaced apart for this purpose. As is indicated in Fig. 9, this rear member may be clamped or bolted to the vertical contact face or portion 3 of the frame end 1 against which the connector ends 84 are simultaneously clamped or bolted and in addition to the upper aligning edge 2 on this frame end it is sometimes advantageous to provide an inclined wedging aligning edge or surface 82 on the lower portion of the head the slope of which is indicated by the rearwardly extending dotted line so arranged as to engage and be wedged into forcible holding contact with the lower flange 87 so as to more definitely hold these buffer elements in desired position. A convenient and effective way of securing these parts together is by supporting bolts 85 one or more of which may be used so as to extend through the rear transverse member and each cooperating connector portion of the buffer before entering the frame end, a single substantial bolt in each frame end often being sufficient to give strong and reliable connection between these parts as is indicated in Fig. 9. It is, of course, understood that these attachments may be used on the rear ends of the automobile frame members, to support suitable rear buffers therefrom, the supporting frame ends in that case being formed to accommodate the usual shackle bolt to which the spring shackles are connected.

This invention has been described in connection with a number of embodiments, forms, proportions, parts, arrangements, materials, methods of connection and use, to the details of which disclosure the invention is not of course to be limited, since what is claimed as new and what is desired to be secured by Letters Patent is set forth in the appended claims.

I claim—

1. The automobile buffer comprising a transverse rear supporting member of channel sectioned spring steel having upwardly bent connector ends, cooperating built-in supporting frame ends permanently connected to the forward ends of the automobile frame members and each having a spring hanger connection and a substantially vertical front contact face to be engaged by the inner rear face of the channel sectioned transverse buffer member, the rearwardly extending flanges thereof engaging and being aligned by the adjacent aligning edges on said heads, bolts passing through said transverse member and extending into said head to clamp the parts together in mutually reenforcing position and a cooperating buffer front of spring steel strip comprising a double strip buffer front and end loops and inturned connector portions to be clamped to the connector ends of said transverse buffer member.

2. The automobile buffer comprising a transverse rear supporting member of channel sectioned spring steel having connector ends, cooperating built-in supporting frame ends permanently connected to the forward ends of the automobile frame members and each having a spring hanger connection and a substantially vertical front contact face to be engaged by the inner rear face of the channel sectioned transverse buffer member, the rearwardly extending flanges thereof engaging and being aligned by the adjacent aligning edges on said heads, bolts passing through said transverse member and extending into said head to clamp the parts together in mutually reenforcing position and a cooperating buffer front of spring steel strip comprising inturned connector portions to be clamped to the connector ends of said transverse buffer member.

3. The automobile buffer comprising a transverse rear supporting member of channel section having outwardly extending connector ends, cooperating supporting frame ends connected to the forward ends of the automobile frame members, and having a spring hanger connection and a substantially vertical front contact face to be engaged by the inner rear face of the transverse buffer member, a rearwardly extending flange thereof engaging and being aligned by the adjacent aligning edges on said heads, clamping means cooperating with said transverse member and said head to clamp the parts together in mutually reenforcing position and a cooperating buffer front comprising inturned connector portions clamped to the connector ends of said transverse buffer member.

4. The automobile buffer comprising a transverse rear supporting member of channel section having outwardly extending connector ends, cooperating supporting frame ends connected to the forward ends of the automobile frame members, and having a substantially vertical front contact face to be engaged by the inner rear face of the transverse buffer member, a rearwardly extending flange thereof engaging and being aligned by the adjacent aligning edges on said heads, clamping means cooperating with said transverse member and said head to clamp the parts together in mutually reenforcing position and a cooperating buffer front comprising connector portions clamped to the connector ends of said transverse buffer member.

5. The automobile buffer comprising a rear supporting transverse buffer member of angular sectioned spring steel having outwardly extending upwardly bent connector ends, cooperating built-in supporting frame ends permanently connected to the forward ends of the automobile frame members, and each having a spring hanger connection and an aligning edge and an adjacent substantially vertical front contact face to be engaged by the inner rear face of the transverse buffer member, the rearwardly extending flange thereof engaging and being aligned by the adjacent aligning edges on said heads, bolts passing through said transverse member and extending into said heads to clamp the parts together in mutually reenforcing position and a cooperating buffer front of spring steel comprising end loops and inturned connector portions to be clamped to the connector ends of said transverse buffer member.

6. The automobile buffer comprising a rear supporting transverse buffer member of angular sectioned spring steel having outwardly extending connector ends, cooperating built-in supporting frame ends permanently connected to the forward ends of the automobile frame members, and each having a spring hanger connection and substantially vertical front contact face to be engaged by the inner rear face of the transverse buffer member, bolts passing through said transverse member and extending into said faces to clamp the parts together in mutually reenforcing position and a cooperating buffer front of spring steel comprising end loops and inturned connector portions to be clamped to the connector ends of said transverse buffer member.

7. The automobile buffer comprising a rear supporting transverse buffer member of angular section having outwardly extending connector ends, cooperating supporting frame ends connected to the forward ends of the automobile frame members, and each having a projecting head formed with an aligning portion and an adjacent substantially vertical front contact face to be engaged by the rear face of the transverse buffer member, a rearwardly extending flange thereof engaging and being aligned by the adjacent aligning portions on said heads, bolts passing through said transverse member and extending into said heads to clamp the parts together in mutually reenforcing position and a cooperating buffer front comprising end loops and inturned connector portions to be clamped to the connector ends of said transverse buffer member.

8. The automobile buffer comprising a rear supporting transverse buffer member of angular section having outwardly extending connector ends, cooperating supporting frame ends connected to the forward ends of the automobile frame members, and each having a projecting head formed with an aligning portion and an adjacent front contact face to be engaged by the rear face of the transverse buffer member, a rearwardly extending flange thereof engaging and being aligned by the adjacent aligning portions on said heads, clamping means cooperating with said transverse member and said heads to clamp the parts together in mutually reenforcing position and a cooperating buffer front clamped to the connector ends of said transverse buffer member.

9. The automobile buffer attaching device comprising built-in supporting frame ends permanently connected to the forward ends of the automobile frame members and having projecting heads formed with spring hanger connections and substantially aligned aligning edges and adjacent vertical front contact faces adapted to be engaged by the inner rear face of an angular sectioned transverse buffer member, the rearwardly extending flange portions thereof being adapted to be engaged and aligned by the adjacent aligning edges on said heads, there being bolt apertures formed in said heads to accommodate bolts passing through said transverse member and adapted to securely clamp the parts together in mutually reenforcing position and support a cooperating buffer front clamped to the outwardly extending connector ends of said transverse buffer member.

10. The automobile buffer attaching device comprising built-in supporting frame ends permanently connected to the forward ends of the automobile frame members and having projecting heads formed with substantially aligned aligning edges and adjacent vertical front contact faces adapted to be engaged by the inner rear face of an angular sectioned transverse buffer member, the rearwardly extending flange portions thereof being adapted to be engaged and aligned by the adjacent aligning edges on said heads, and means adapted to securely clamp the parts together in mutually reenforcing position and support a cooperating buffer front clamped to the outwardly extending connector ends of said transverse buffer member.

11. The automobile buffer attaching device comprising supporting frame ends connected to the forward ends of the automobile frame members and having projecting heads formed with spring hanger connections and substantially aligned vertical aligning means and adjacent vertical front contact faces adapted to be engaged by the rear face of a transverse buffer member, the rearwardly extending aligning portions thereof being adapted to be engaged and aligned by the adjacent aligning means on said heads, there being bolt apertures formed in said heads, to accommodate bolts passing through said transverse member and adapted to securely clamp the parts together in mutually reenforcing position.

12. The automobile buffer attaching device comprising supporting frame ends connected to the forward ends of the automobile frame members and having projecting heads formed with aligning means including inclined wedging lower edges and adjacent vertical front contact faces, a cooperating channel sectioned transverse buffer member the rearwardly extending flange portions thereof being adapted to be engaged and wedgingly aligned by the aligning means on said heads, cooperating spring steel buffer members including inturned connector portions fitting within the flanged ends of said transverse buffer member, there being bolt apertures formed in said heads to accommodate bolts passing through said transverse member and means engaging said cooperating connector portions and adapted to securely clamp the parts together in mutually reenforcing position and support a cooperating buffer front.

13. The automobile buffer attaching device comprising built-in supporting frame ends permanently connected to the forward ends of the automobile frame members and having projecting heads formed with spring hanger connections and substantially aligned aligning means including inclined lower aligning means and adjacent vertical front contact faces, a cooperating channel sectioned transverse buffer member the rearwardly extending end flange portions thereof being engaged and wedgingly aligned by the aligning means on said heads, cooperating steel strip buffer members including inturned connector portions fitting within the flanged ends of said transverse buffer member, there being threaded bolt apertures formed in said heads to accommodate bolts pasing through said transverse member and means engaging said cooperating connector portions and adapted to securely clamp the parts together in mutually reenforcing position.

14. The automobile buffer attaching device comprising built-in supporting frame ends permanently connected to the forward ends of the automobile frame members and having spring hanger connections and aligning means including lower aligning means and adjacent vertical front contact faces, a cooperating transverse buffer member the rearwardly extending end flange portions thereof being engaged and aligned by the aligning means on said frame ends, cooperating steel strip buffer members including inturned connector portions fitting within the flanged ends of said transverse buffer member adjacent said contact faces, and clamping means to securely clamp said transverse member and said cooperating connector portions to said heads in mutually reenforcing position.

15. In attaching devices to detachably support an automobile buffer, a supporting frame end having a rearwardly extending supporting portion adapted for permanent built-in connection with the end of the automobile frame member, said frame end being formed with an integral head to extend forward beyond the end of said frame member and provided with a threaded bolt aperture for a buffer securing bolt and having an upper aligning edge and an inclined wedging lower aligning edge and an adjacent substantially vertical contact face to which a channel sectioned transverse buffer member is adapted to be secured.

16. In attaching devices to detachably support an automobile buffer, a supporting frame end having a rearwardly extending supporting portion adapted for connection with the end of the automobile frame member, said frame end being formed with an integral head to extend forward beyond the end of said frame member and provided with a bolt aperture for a buffer securing bolt and having an inclined wedging aligning edge and an adjacent substantially vertical contact face to which a channel sectioned transverse buffer member is adapted to be secured.

17. In attaching devices to detachably support an automobile buffer, a supporting frame end having a rearwardly extending supporting portion adapted for connection with the end of the automobile frame member, said frame end being formed with a head to extend forward beyond the end of said frame member and provided with a bolt aperture for a buffer securing bolt and having a horizontal aligning edge and an adjacent substantially vertical contact face on which an angular sectioned transverse buffer member is adapted to be secured and aligned.

GEORGE ALBERT LYON.